(12) United States Patent
Mischo

(10) Patent No.: US 6,862,842 B2
(45) Date of Patent: Mar. 8, 2005

(54) MODULAR GREEN ROOF SYSTEM, APPARATUS AND METHODS, INCLUDING PRE-SEEDED MODULAR PANELS

(75) Inventor: Donald J. Mischo, Janesville, WI (US)

(73) Assignee: American Builders & Contractors Supply Co., Inc., Beloit, WI (US)

( * ) Notice: Subject to any disclaimer, the term of this patent is extended or adjusted under 35 U.S.C. 154(b) by 0 days.

(21) Appl. No.: 09/908,881

(22) Filed: Jul. 18, 2001

(65) Prior Publication Data
US 2002/0007592 A1 Jan. 24, 2002

Related U.S. Application Data
(60) Provisional application No. 60/219,457, filed on Jul. 18, 2000, provisional application No. 60/218,889, filed on Jul. 18, 2000, and provisional application No. 60/219,063, filed on Jul. 18, 2000.

(51) Int. Cl.[7] .............................................. A01G 9/02
(52) U.S. Cl. ...................................................... 47/65.9
(58) Field of Search ............................... 47/65.9, 66.5, 47/86, 58.1 R, 40.1, 70.1, 84

(56) References Cited

U.S. PATENT DOCUMENTS

| 986,395 | A | * | 3/1911 | King ........................ 47/65.9 |
|---|---|---|---|---|
| 4,926,586 | A | * | 5/1990 | Nagamatsu ................ 47/65.9 |
| 5,187,894 | A | * | 2/1993 | Ripley et al. ................. 47/86 |
| 5,309,846 | A | * | 5/1994 | Peterson .................. 108/53.3 |
| 5,467,555 | A | * | 11/1995 | Ripley et al. ............... 47/65.9 |
| 5,595,021 | A | * | 1/1997 | Ripley, Sr. et al. .......... 47/65.9 |
| 5,673,513 | A | * | 10/1997 | Casimaty .................. 47/65.9 |
| 6,134,834 | A | * | 10/2000 | Ripley, Sr. et al. ............. 47/86 |
| 6,263,616 | B1 | * | 7/2001 | Hummer .................... 47/65.9 |
| 2002/0007591 | A1 | * | 1/2002 | Mischo ...................... 47/65.9 |
| 2002/0007592 | A1 | * | 1/2002 | Mischo ...................... 47/65.9 |
| 2002/0007593 | A1 | * | 1/2002 | Mischo ......................... 47/86 |

FOREIGN PATENT DOCUMENTS

| JP | 4-360629 | * | 12/1992 | ............ A01G/9/24 |
|---|---|---|---|---|
| JP | 9-51727 | * | 2/1997 | ............ A01G/9/02 |
| JP | 10-215687 | * | 8/1998 | |
| JP | 11-75568 | * | 3/1999 | |
| JP | 11-113402 | * | 4/1999 | ............ A01G/1/12 |
| JP | 11-155369 | * | 6/1999 | |

* cited by examiner

Primary Examiner—Jeffrey L. Gellner
(74) Attorney, Agent, or Firm—Keith Frantz

(57) ABSTRACT

A modular green roof system includes modular panels (10) providing a surrounded space suitable for supporting live plant growth and adapted for installing onto a roof deck in side-by-side positioning while allowing water flow on the roof thereunder. The panels are filled with growing medium and pre-seeded prior to delivery to the roof site, and delivered in either a preserved condition or a germinated condition. The panels are adapted for interconnecting to adjacent panels, and for connection to an edge finishing/edge termination system (46) and support structure to enable provision of non-panel areas of the green roof, and above-panel structures.

7 Claims, 8 Drawing Sheets

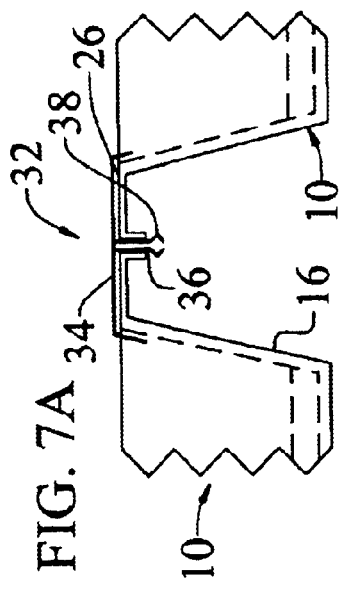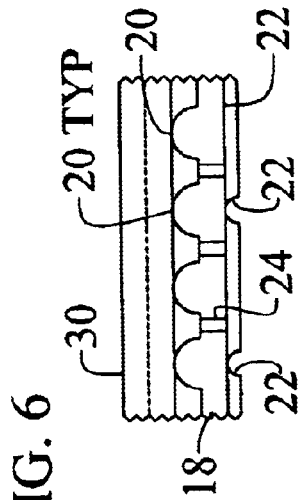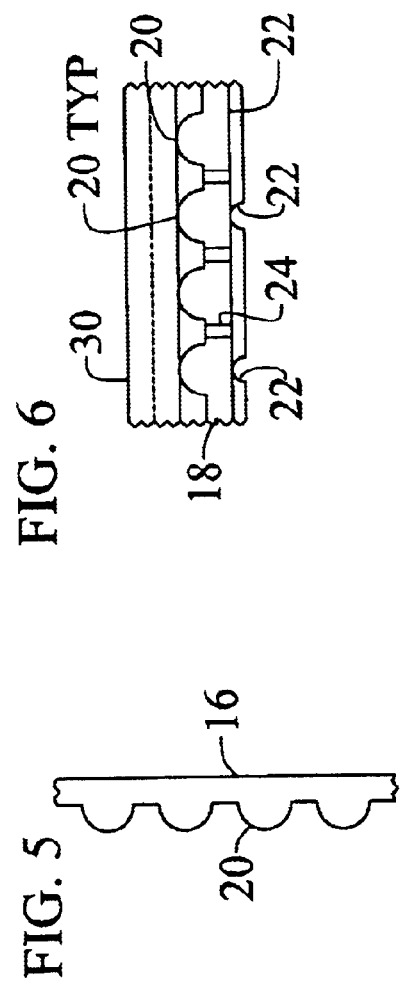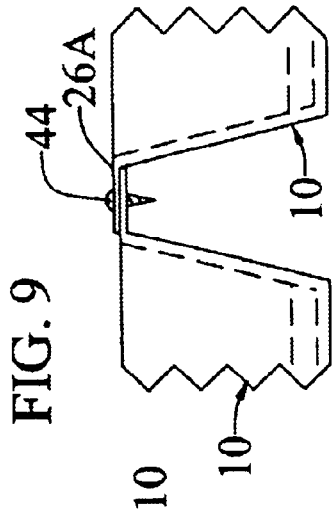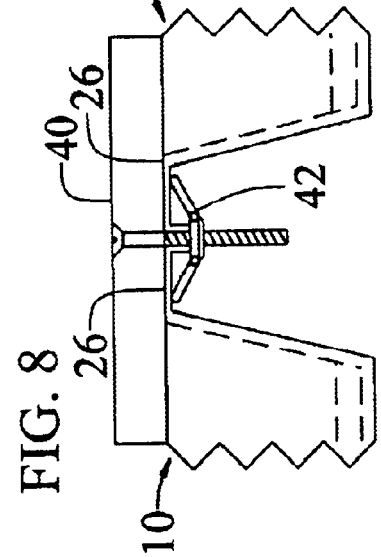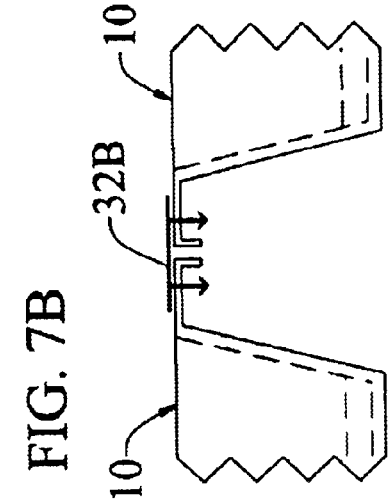

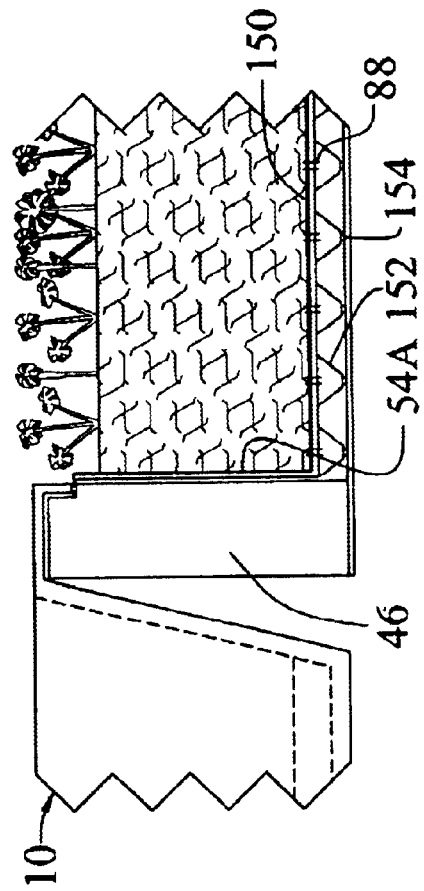
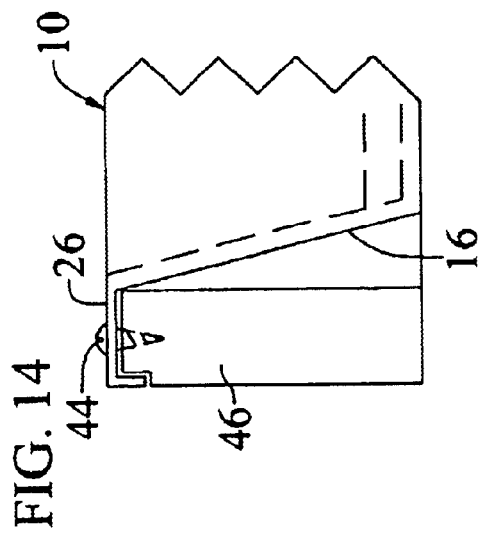
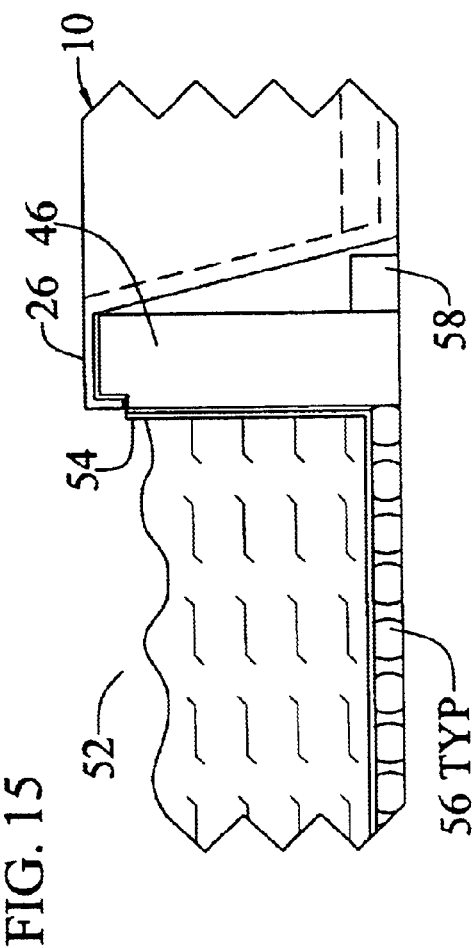

MODULAR GREEN ROOF SYSTEM, APPARATUS AND METHODS, INCLUDING PRE-SEEDED MODULAR PANELS

CROSS-REFERENCES TO RELATED APPLICATIONS

This application claims the benefit of U.S. Provisional Patent Applications Ser. No. 60/218,889 filed Jul. 18, 2000, Ser. No. 60/219,063 filed Jul. 18, 2000, and Ser. No. 60/219,457 filed Jul. 18, 2000.

REFERENCE TO MICROFICHE APPENDIX

Not applicable.

STATEMENT REGARDING FEDERALLY SPONSORED RESEARCH OR DEVELOPMENT

Not applicable.

TECHNICAL FIELD

The present invention relates generally to green roof systems, also known as roof landscaping systems and roof gardens, that are suitable for supporting live plant growth on building roofs.

More particularly, the invention relates to modular green roof systems, and methods and apparatus for use therewith.

BACKGROUND OF THE INVENTION

Briefly, prior green roof systems typically comprise several layers of materials suitable to support vegetation on a roof. These layers are typically supplied in bulk or earthen rolls that are rolled into position on the roof.

Common types of vegetation used in green roof systems include herbs, grasses, mosses, wild plants and flowers, and other types of perennials.

A typical prior green roof system includes at least (i) a waterproofing membrane laid over the roof or roof supporting structure, (ii) based on the roof grade, a layer over the waterproofing membrane of one of: (a) a drainage layer and an overlaying blanket of root growth protection material (for a grade of approximately 2 to 5 degrees), (b) a root growth protective fleece (for a grade of approximately 6 to 10 degrees), and (c) a substrate fixing or erosion control blanket including root growth protection (for a grade of approximately 10 to 20 degrees); (iii) a layer of mineral wool or other substrate for water retention, and (iv) a top layer of vegetation growing in a fiber fleece or other suitable growing medium.

Other green roof designs include additional layers of various materials for various roof protection and vegetation growth support purposes.

It is believed that prior green roof systems of the above general type were first used in Europe approximately 20 years ago. Since that time, use of similar and derivative green roof systems has become common in many parts of Europe on commercial, institutional, industrial, and residential buildings, and interest in green roof systems is growing in the United States.

The advantages typically attributed to green roof systems include extending the roof service life; reducing heating and cooling energy costs; conserving and utilizing valuable commercial space; reducing runoff from roof surfaces; and increasing property values.

However, inspection of such prior systems also reveal the following disadvantages:

the prior systems are relatively expensive and are difficult to install, typically requiring the need for and assistance of a specially trained consultant;

the systems are not designed to be installed over an existing functional roof without the necessity of reroofing;

thus, a complete new waterproofing membrane must typically be installed before the green roof system can be used on existing buildings, resulting in additional costs;

since the green roof materials are delivered in bulk or earthen rolls, design freedom is limited, alternating designs of plants are not easily incorporated in the design of the green roof;

terracing or variations of surfaces are also not easily accomplished; and changing of the design layout after installation requires removal and destruction of the effected area and replanting with the new design;

selection of pre-growing plants in the upper fiber fleece is typically limited to low-growing plants, mosses, etc., since the fleece is supplied to the roof in rolls;

selection of pre-grown plants available is further typically limited because: the need to maintain the plants in the growing state prior to shipment results in additional costs; the demand must be estimated in advance of the installation season in order to have the pre-grown plants ready; and such estimates are typically conservative in order to prevent overstocking and spoilage if not used during that season; and maintenance and repair to the roof is difficult and expensive; if a leak develops in the roof membrane, or if other maintenance or repair is required, the entire green roof, or at least large portions of the green roof, must be removed to locate and repair the leak or accomplish the desired maintenance; the removed green roof must then be replaced and replanted.

Thus, it is clear there is a need for new and improved green roof systems which:

are less expensive and more easily installed than prior green roof systems;

can be installed over existing roofing materials on existing buildings, thus eliminating the need and associated cost to install completely new roofing membranes or systems prior to installation of the green roof;

provide for substantially enhanced design flexibility and freedom, including;
  the ability to change the design layout of the green roof after initial installation, and
  the ability to be used either as a standalone system, or in combination with prior green roof systems
    as an original green roof layout and design including both prior systems and systems in accordance with the present invention, and
    to enable repair of a prior green roof such as when a portion of the prior green roof has been removed for repairs of the building roof deck, to eliminate the current need to re-install the entire prior green roof systems after such removals or repairs; and permit ease of access to desired portions of the roof for maintenance and repair without the need to destroy and then replace large portions of the green roof.

SUMMARY OF THE INVENTION

The general aim of the present invention is to provide new and improved green roof systems, and methods and apparatus therefore—to address the above-identified disadvantages of prior green roof systems and achieve the advantages and benefits flowing from addressing the above-identified needs thereof.

More particularly, it is an objective of the invention to provide a modular green roof system comprising pre-seeded modular panels having a surrounded space suitable for supporting live plant growth and adapted for installing onto an existing roof deck in side-by-side positioning while allowing water flow on the roof thereunder.

The panels are filled with growing medium and pre-seeded prior to delivery to the roof site, and delivered in either a preserved condition or a germinated condition, and are adapted for packaging, shipping and delivery in either condition. In preferred embodiments, the panels are also provided with a watering system to assist in supporting the growing plants therein.

The panels are further adapted for, and associated apparatus and methods are provided for, interconnecting to adjacent panels, connection to an edge finishing/edge termination system and a support structure, and lifting and positioning into place on the roof, or removing from the roof, without disturbing adjacent panels.

Consequently, the pre-seeded modular panels of the invention are more easily installed than prior green roof systems. The pre-seeded modular panels enhance design-layout flexibility by enabling provision of a greater selection of growing and non-growing materials for the green roof system without concern for spoilage, enabling the growing materials to include those requiring greater soil depth than is available in prior green roof systems, and enabling the panels to be rearranged after installed. These aspects allow the designer or architect to select a broad variety of various colored or height plants to be incorporated within the system. In addition, the panels can be filled with proper growing soil composition for optimal growth potential for each pre-planted species, the panels can be alternately filled with any desired or decorative material such as gravel or concrete for walkways, and the filled panels can be used to achieve a desired weight for desired ballast required for loose-laid membrane roof such as of at least approximately 10–12 lb./sq. ft.

In combination with the edge termination/edge finishing system and support structure, the panels enable provision of multi-level terracing of the green roof, provision of bounded areas for uses such as a water pond, a field planted area, walkway areas, and putting greens, provision of above-panel structures, and other elements to the designer's imagination. The modular panels also provide for ease of repair of the roof structure by simply removing the necessary panels, thus eliminating the need to destroy a substantial portion of the installed green roof as with prior green roof systems.

BRIEF DESCRIPTION OF THE DRAWINGS

FIG. 5 is fragmentary top view taken substantially along the line 5—5 of FIG. 4.

FIG. 6 is fragmentary view taken substantially along the line 6—6 of FIG. 4.

FIGS. 7A and 7B are fragmentary views showing adjacent modular panels connected together as installed on a roof with alternate closure/connector strips.

FIGS. 8 and 9 are views similar to FIG. 7 but showing alternate apparatus connecting the adjacent panels.

FIG. 14 is an enlarge fragmentary view of a panel edge system in accordance with another aspect of the invention.

FIG. 15 is a fragmentary cross-sectional view showing construction details of one embodiment of a non-modular area of the green roof, and more particularly, showing a pond area such as generally indicated in FIG. 1.

FIG. 28 is a view similar to FIG. 15 of an alternate bounded non-modular area of the green roof system.

Figure 1:
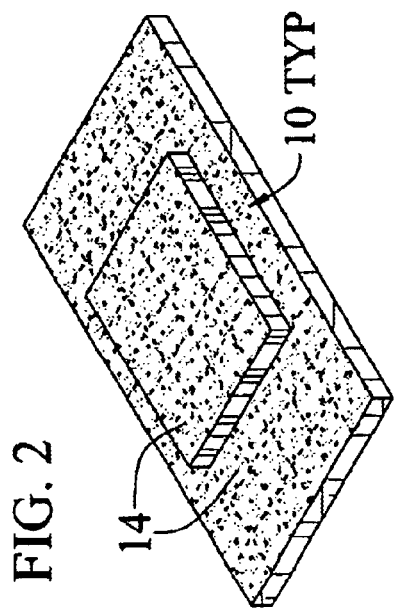
FIG. 1 is a top diagrammatic view of a modular green roof system in accordance with and incorporating the unique aspects of the present invention.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

BEST MODE FOR CARRYING OUT THE INVENTION

Brief Description of Modular-Design Green Roof System

The present invention relates to a modular-design green roof system that is uniquely adapted to provide versatility of design with a broad range of design layout possibilities, while simultaneous providing for ease of installation and maintenance, and repairs to both the green roof and the underlying roof structure or roof deck of the building on which the green roof is installed.

Green roof systems of the present invention include pre-seeded modular pans or containers herein generally referred to as "panels" adapted to provide both green and non-green areas on the roof deck, and certain associated apparatus adapted to provide for design freedom and ease of installation, maintenance and repairs. Preferred systems also include apparatus for releasably connecting the modular panels together, and edge termination; for ease of maintenance and repair of the underlying roofing structure and replacement of the modular panels, for defining the boundaries of the green roof areas provided by the modular panels and optionally providing bounded non-green roof areas such as for ponds, walkways, putting greens and other desired structures or uses.

Briefly, filled panels are arranged on a roof deck in a desired aesthetic design layout such as illustrated in FIG. 1 in which the numbers associated with each panel 10 represent characteristics of the panels and/or the green roof—panel fill materials.

The panels can be of different heights and depths, and planted with various sedum, foliage, or perennials to provide for various "green" areas for a desired visual effect. Alternately, and in addition, the panels can be filled with decorative and/or functional materials such as gravel, decorative rocks, mulch or other materials to provide for "non-green" areas.

In accordance with the invention, the panels are pre-filled and pre-planted, i.e., pre-seeded, such that the pairs of numbers associated with each panel shown in FIG. 1 may represent, for example, the (i) height of the panel and (ii) the type and/or color of plant in the panel. This provides substantial design freedom and ease of layout design from a selection of pre-planted pre-designed modular units. Preferred embodiments include provision for releasably connecting the modular panels together, and edge termination systems. The interconnecting panels provide for, among other things, assisting in maintaining the panels in place on the roof, for ease of maintenance and repair of the underlying roofing structure and for ease of replacement of the modular panels. The edge termination systems provide for, among other things, defining the boundaries of the green roof areas provided by the modular panels, and optionally providing bounded non-green (non-growing) roof areas such as for ponds, walkways, putting greens and other desired structures or uses.

Design versatility of the present invention is further illustrated in FIG. 1 wherein the green roof includes a ponded area 12, and in the multi-level green roof embodiment shown at 14 in FIG. 2, both of which are discussed further below.

Modular Panels

In accordance with one aspect of the invention, modular panels are provided that are adapted for filling with a growing medium and supporting plant life, and are suitable for placing directly onto a roof deck in a modular green roof system.

As discussed further below, the panels optionally include a cover, or are configured for accepting a cover, and/or for temporarily connecting together for storage and transportation of pre-filled panels prior to installation, and/or for temporary storage and stacking during repairs to the roof.

One embodiment of a modular panel suitable for use in accordance with the present invention is the panel 10 shown in detail in FIGS. 3–6.

In this instance, the panel 10 is vacuum formed, molded or otherwise shaped modular panel made from high-strength plastic, HDPE (high density polyethylene), recycled rubber or any moldable material suitable to achieve cost effective manufacture, sufficient strength and rigidity for the panel size, and a desired durability and long life.

The panels are formed in modular sizes convenient for handling such as between approximately one and one-half to eight inches deep, and up to 16 square feet surface area, or otherwise as desired. One convenient size for certain roofs and greenery, and for manual handling is a pan measuring approximately 2 feet by 4 feet. The preferred shape of the panels is generally rectangular so that the panels cooperate with each other and/or additional apparatus discussed below, to generally cover the roof when viewed from above.

The sides 16 and bottom 18 of the panel 10 shown are formed with reinforcing ribs 20 (see FIGS. 5 and 6) to achieve additional strength and rigidity for a given wall thickness.

A waffle design on the under side of the bottom 18, such as defined by criss-crossing ribs or flow passages 22 extending along the underside of the panel, or other downwardly facing voids, for lowered feet portions (not shown) to raise the floor of the panel above the roof, allow multi-directional free water flow and drainage on the roof deck under the panel.

Drain holes 24 formed through the bottom 18 of the panel 10 provide water drainage of soil mass or other contents in the panel. The size and number of drain holes in this area can be varied to provide the ideal amount of moisture content for the various types of plants and soil Drain ports or holes 24A formed in the sides of the panels 10 are placed to assure run off therethrough in the event the water level in the panel rises to the height of these holes, thereby providing a control for the total weight of the panels during periods of excessive rainfall.

Optional grooves 30 are formed along the bottom of the panel 10 to assist in installation and removal of filled panels as discussed further below.

The sides 16 of the panel 10 are preferably tapered to allow for ease of removal from the vacuum mold, and for additional reasons discussed below, are preferably sized for clearance in the neighborhood of between approximately 1 to 2 inches between sides of adjacent panels when in side-by-side relation.

Flanges 26 may be formed in a desired configuration along the upper edge portions of the panel 10 for cooperation with adjacent panels, and/or connecting and termination arrangements discussed below. Advantageously, flanges provide the panel with additional stiffness, to assist in maintaining the panel shape when moving filled panels.

A webbing or netting 28 is placed on the bottom of the panel 10 prior to filling with the growing medium to prevent root growth into and through the drain holes 24 and onto the roof deck below the panel.

As will be apparent, alternate modular panel embodiments, adapted for filling with either a decorative fill, or a growing medium and plant life, and including alternate construction and flange or edge details, are also suitable for use in the green roof system of the present invention as contemplated herein.

Accordingly, a green roof system can be quickly and easily installed with the use of such modular panels by covering the roof, or the desired portion of the roof, with panels in side by side or abutting relation, the panels being filled with desired growing and non-growing green roof materials.

Advantageously, the larger, heavier filled panels provide the ballast that is necessary for a conventional loose-laid membrane roof in a modular manner to permit ease of removal for inspection of and repair to the membrane.

Interconnecting Modular Panels

In preferred embodiments, modular panels are provided for releasably connecting together. Such an arrangement is useful in providing a cohesive green roof system, and is particularly useful in connection with shallow, relatively light panels to prevent high wind from lifting the panels from the roof deck.

In carrying out this aspect of the invention, in the embodiments shown, apparatus is provided for releasably connecting the flanges of adjacent panels together. Alternately, for example, for panels without flanges, the sides of adjacent panels may be connected directly together.

One embodiment of panel/flange connector is shown in the drawings in FIG. 7A as a closure strip 32 in the form of an elongated, extruded plastic or aluminum strip comprising an outer face 34 sized to overlap the outer edge portions of the flanges 26 of adjacent panels, and a pair of laterally spaced leg portions 36 and associated bent knee portions 38 extending downwardly from the outer face 34 and cooperating to cover or seal off the void between the adjacent panels. An alternate closure strip 32B shown in FIG. 7B is provided with sharp prongs that are inserted through the flanges of adjacent panels to connected the panels together.

In an alternate embodiment shown in FIG. 8, adjacent panels are connected with a closure strip 40 such as a molded plastic or treated wood strip, and suitable fasteners such as the butterfly type threaded fastener 42 to secure the flanges 26 of the adjacent panels to the closure strip.

A second alternate connector is shown in FIG. 9 connecting modified flanges 26A. In this instance, the adjacent flat flanges are positioned overlapping one another, and are connected with fasteners such threaded screws 44. As discussed further below, in the event of connecting the flanges in an overlapping manner, the flanges are preferably relatively flexible or resilient such that the panel with the flange under the other may be removed from the roof without the need to remove the panel having the flange on top.

Persons skilled in the art will appreciate alternate connectors or fasteners may be used for releasably connecting adjacent panels together, with the edge details or flanges of the panels being modified for use therewith. By way of non-limiting examples, in alternate embodiments not shown, the panels are provided with releasable, snap-together interlocking flanges for connecting adjacent panels, apparatus is provided for connecting parts of adjacent panels other than with the flanges or upper edges of the panels, or holes are provided in the adjacent panels for the use of cable ties and other flexible connectors to tie the panels together.

Watering System

Figure 11:
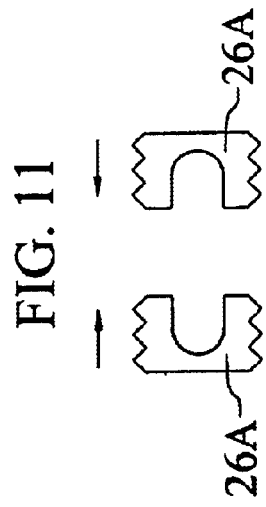
FIG. 11 is a top view of the panel flanges of FIG. 10 but showing the flanges separated for illustrative purposes.
Figure 10:
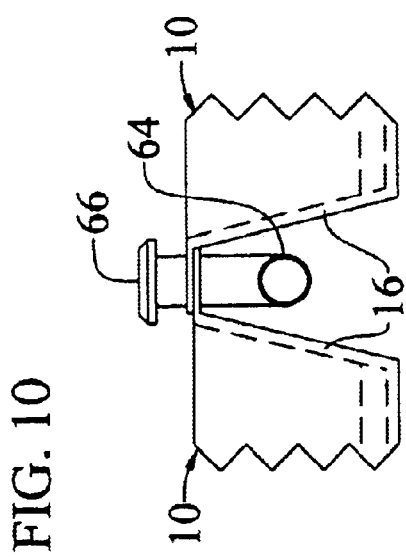
FIG. 10 is a view similar to FIG. 7 but showing a water line and riser of an installed watering system.
Figure 12:
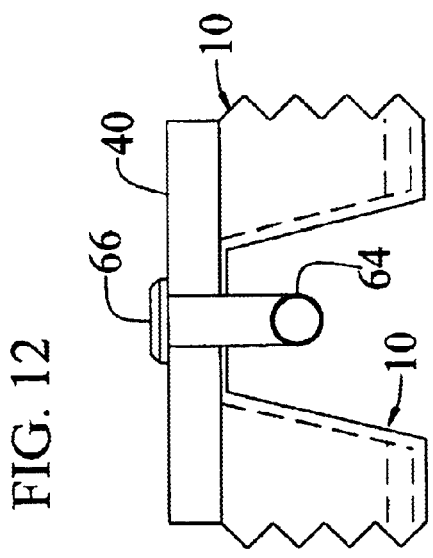
FIG. 12 is a view similar to FIG. 11 but showing the watering system components as installed in connection with the alternate panel connector of FIG. 8.

To provide for ease of maintenance of the green roof system, the panels are preferably provided with interconnecting watering apparatus connected to one or more water supply lines. Conveniently, a water supply line 64 is optionally provided, running in the approximately 1 to 2 inch clearance provided between adjacent tapered panels such as shown in FIGS. 10 and 12, with pressurized irrigation risers 66 extending upwardly through the overlapped flanges 26A of the adjacent panels, or, for example, through the closure strip 40 (FIG. 12) for periodic watering of the plant life in the green roof system. In this instance, one or both of the overlapping flanges 26A are notched (such as shown in FIG. 11 wherein the flanges are shown separated for illustrative purposes) for the riser to extend therethrough.

Advantageously, such internal watering arrangements provide additional design freedom since they are easily adapted for use with specific green roof design layouts, such as with the alternate edge systems.

Figure 13:
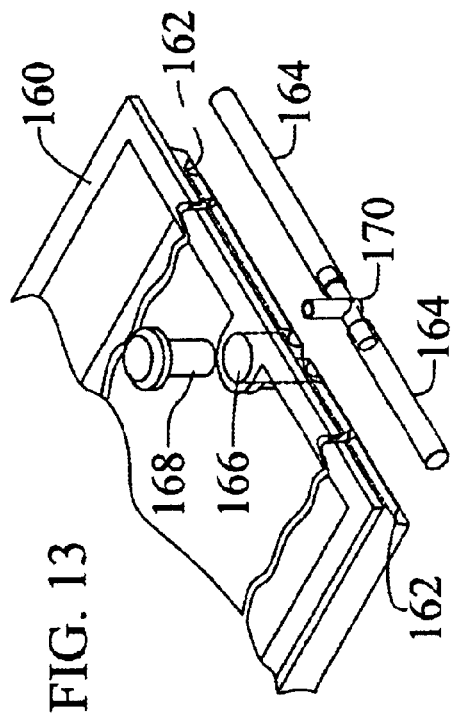
FIG. 13 is a fragmentary perspective view of an alternate panel incorporating integral provisions for a watering system.

An alternate panel 160 molded with integral water line and riser receiving locations is shown in FIG. 13. In this instance, the panel is molded with a pop-out opening 166 sized to receive the riser or standard sprinkler head 168 which is then connected to a T-connector 170 for joining with water line hoses 164 running in cylindrical or curved indentations 162 molded in the sides of the panel.

Figure 31:
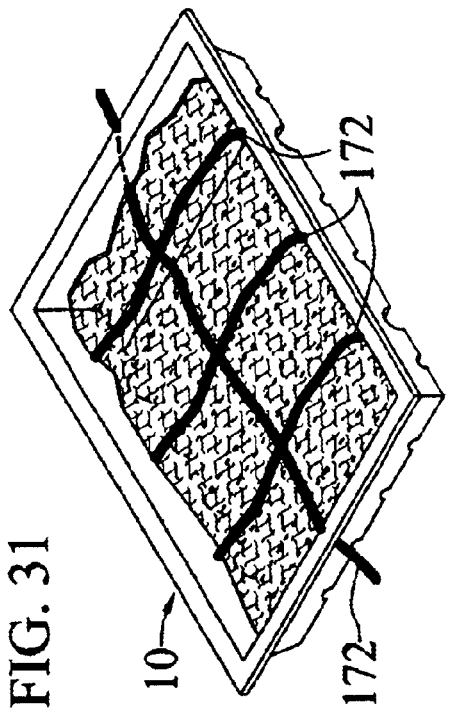
FIG. 31 is a view of a panel provided with alternate flexible, interconnectable, drip-irrigation lines which may be used for both pre-growing prior to delivery to the roof site, and which may be interconnected connected at the roof site.

In another alternate embodiment shown in FIG. 31, the panels are provided with flexible, interconnectable, drip-irrigation lines 172.

Edge Finishing/Green Roof Termination System

In accordance with yet another aspect of the invention, the panels are adapted for use with edge finishing/edge termination systems are provided for connecting to and/or cooperating with the panels to define the various boundaries of the green roof system. Such edge finishing is adapted for decorative effect at the boundaries, and/or for functional purposes including supporting the flanges or panels, or connection between the panels and/or other structures as discussed further below. Briefly, the edge finishing is of a suitable, durable, decorative and/or structural material and configuration for cooperation with the modular panels to define the boundaries of the green roof system.

In carrying out this aspect of the invention, in the embodiments shown, termination detail is provided in the form of an edge finishing—facing material adapted for connection to the flanges of the panels.

Figure 17:
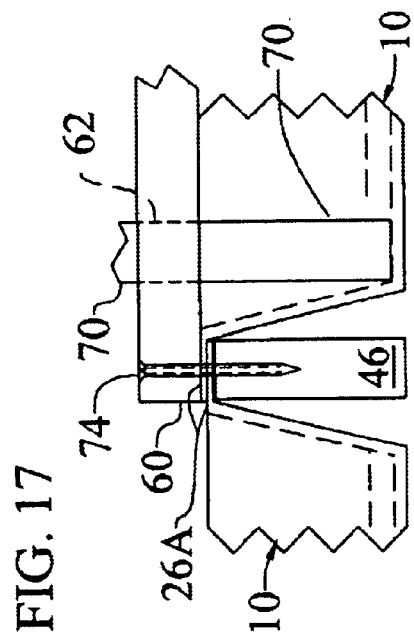
Figure 18:
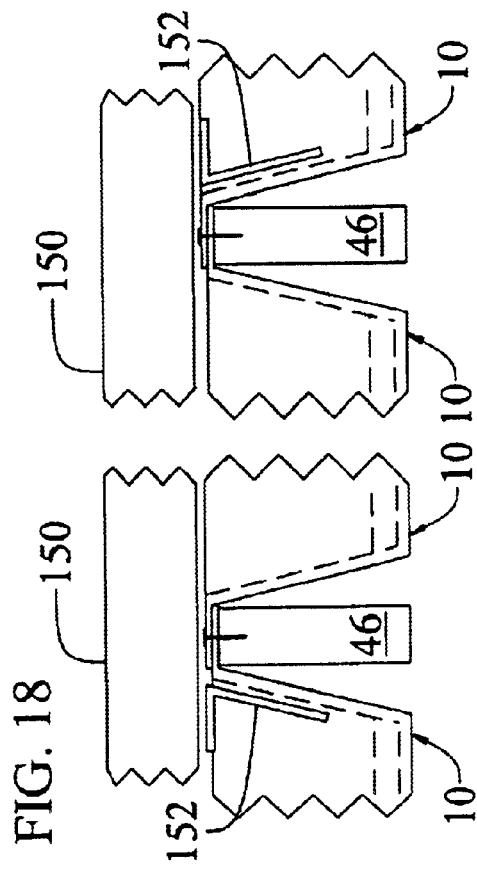
FIG. 18 is a fragmentary side view showing a walkway supported by the panel edge system to provide access to planted areas of the green roof.
Figure 20:
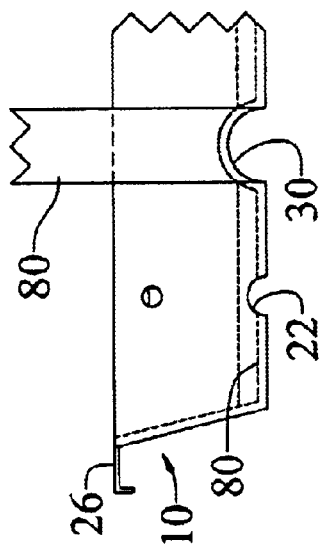
FIG. 20 is a perspective view of a panel and cables adapted to assist in raising and lowering the panel from the roof.
Figure 21:
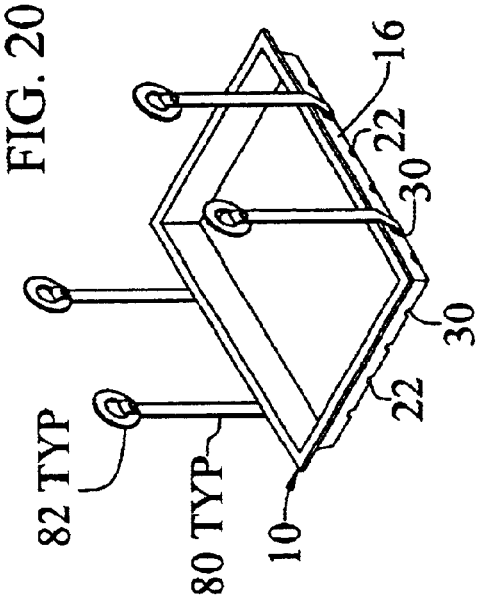
FIG. 21 is an enlarged fragmentary view of the panel and cable shown in FIG. 20.

In the preferred embodiments shown in the drawings, dimensional lumber or composite extruded or other material beam is provided for the termination/facing material to define the boundaries of the green roof system. Such boundaries include outer boundaries, inner boundaries of enclosed areas, and transition boundaries of the green roof system. FIG. 14 illustrates one embodiment of termination or edge detail using a facing material in the form of a structural beam, dimensional lumber or composite extrusion 46 to finish off the exposed edges of panels located along the boundaries of the green roof system. In this instance, the dimensional lumber or composite extrusion 46 is standing on its lower edge on the roof (not shown), and is located under, shaped for, and connected to the flange 26 for positioning and support thereof. As shown in FIGS. 17 and 18, alternate flange-supporting and/or edge systems will be adapted for the specific flange configuration with which they are connected to and/or used with.

Persons skilled in the art will also appreciate that alternate edge finishing/edge termination systems will be provided within the scope of the present invention. By way of non-limiting example, in an alternate embodiment not shown, the outer and inner boundaries of the green roof system are defined by decorative facing material shaped for slipping over the flanges or exposed edges of the modular panels, the facing being sized to extend downwardly to the roof deck.

Multi-level Green Roof

Figure 2:
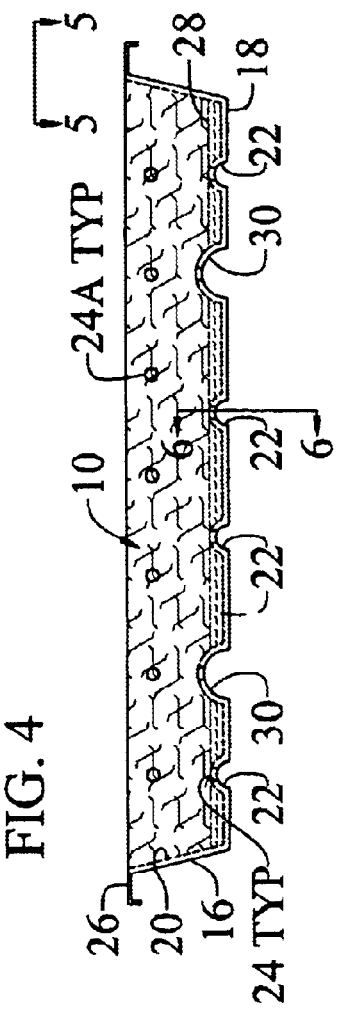
FIG. 2 is a perspective view of a green roof system including multi-level terracing.
Figure 4:
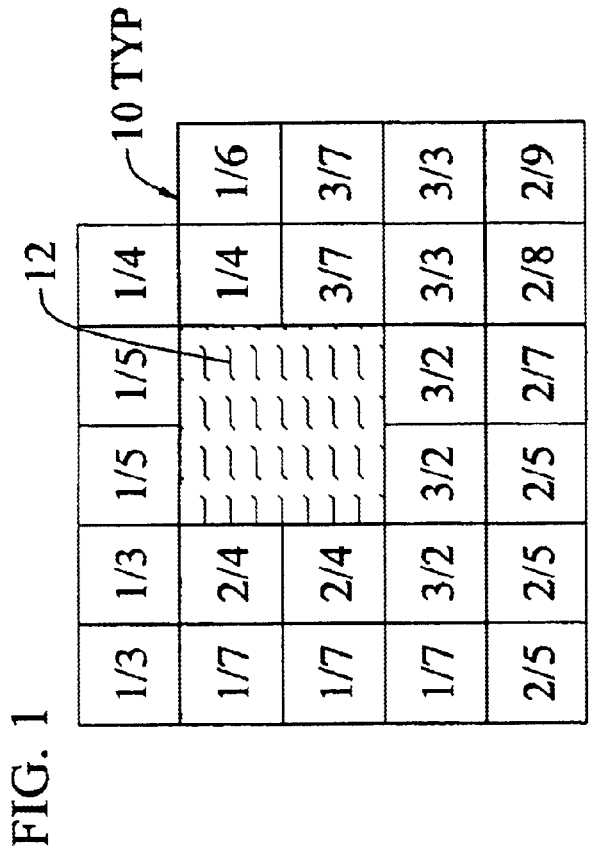
FIG. 4 is a side view of the panel of FIG. 3 and showing the panel pre-seeded in accordance with the invention.
Figure 3:
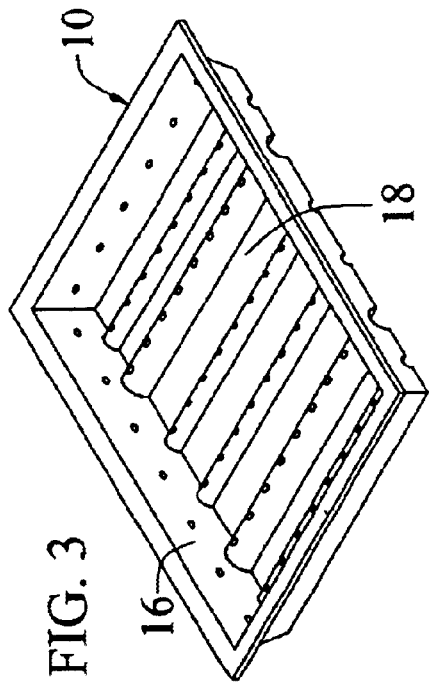
FIG. 3 is perspective view of a modular panel incorporating certain unique aspects of the invention, and suitable for use in a modular green roof system according to the invention.

As previously mentioned and shown in FIG. 2, the present invention contemplates a green roof capable of multi-level terracing. This is accomplished with the use of panels of different depths and intermediate, boundary transition edge finishing systems therebetween.

Advantageously, the ability of the system to accommodate the use of panels of different height also permits the growth of various planted material which may not be suitable for growth in prior green roof systems. In particular, the modular panels and associated apparatus of the present invention enable, for example, provision of plants requiring substantial depth of soil or other growth medium.

In carrying out this aspect of the invention, interconnecting, boundary termination facing material such as described above comprises suitable height transition apparatus and accommodates multi-level terracing in a visually appealing manner.

In particular, one method of transitioning between panels of different heights with the dimensional lumber/composite extrusion edge system described above is shown in detail in FIG. 19. In this instance, the edge pieces 46A and 4GB are secured under associated flanges 26A of adjacent panels of different heights, and are tied together with nails 48. Block 50 is optionally provided for additional lateral support at the base of the edge termination pieces.

In an alternate embodiment edge system, a facing material is connected between the flanges of the adjacent panels of different height to cover the exposed side portions of the taller panel.

Additional Modular Components and Bounded Areas

The present invention also contemplates and accommodates additional modular components and bounded areas—providing for additional design freedom and flexibility. The following are illustrative of a few such additional components and bounded areas, and edge finishing/edge termination systems associated therewith.

Alternate Decorative or Functional Fills

As previously mentioned, the modular panels 10 may be filled with decorative gravel, concrete or other non-green materials for decorative purposes, or functional purposes such as to provide walkways through the green roof.

Figure 19:
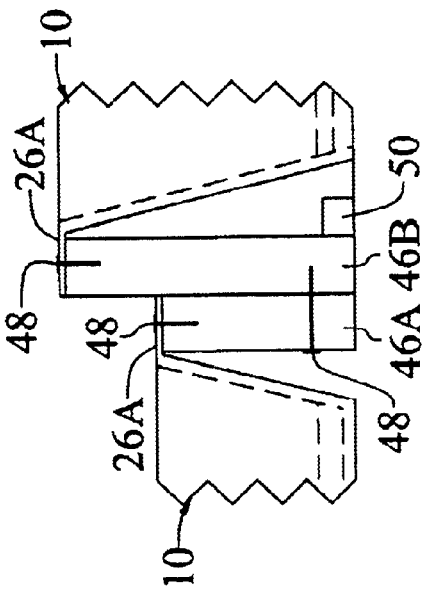
FIG. 19 is a side view of edge termination system suitable for multi-level terracing as generally shown in FIG. 2.

For example, in one embodiment, a walkway is provided with panels of a height less than the surrounding panels filled with, for example, growing greenery, with suitable edge support and edge finishing or height transition system provided such as previously described, and/or as illustrated in FIG. 19.

In an alternate embodiment, the walkway is provided in panels of the same height as surrounding panels, but which may be partially filled with a light-weight "filler" under the walkway material to reduce the weight of the filled panel if desired.

Pond Area

Additional design flexibility is available through the unique ability of green roof systems of the invention to include ponded areas such as indicated in FIG. 1 with the use of an internal boundary edge finishing system.

The details of one embodiment of a pond area 52 is shown in FIG. 15. In this instance, the water is contained in a loose-laid membrane 54, such as made from flexible EPDM, that is surrounded by panel termination dimensional lumber/composite extrusion 46 and is secured between the flanges 26 and the lumber/extrusion; with wooden strip 58 provided for additional lateral support. To insure positive omni-directional drainage on the roof deck, the membrane is laid over a grid work of material such as round river rock 56, to allow drainage under the membrane. Such an arrangement may be adapted for a permanent ponded area purely for aesthetic purposes when provided with a water supply and associated apparatus, or alternately for a collection area for natural rain water, such as to be optionally re-used in watering the green roof system.

Other Non-modular Areas

Use of the edge termination system with the panels 10 to create other non-modular areas of the roof deck provides yet additional flexibility in the design of the green roof system.

For example, in an alternate arrangement shown in FIG. 28, an edge-termination/membrane-enclosed area similar to the ponded area discussed above is used for field planted material to compliment the modular system. In this instance, the membrane 54A is perforated at 88 for drainage, and is lined with anti-root fabric 150 to prohibit growth of roots through the membrane and into the waterways provided on the roof deck. Rather than rounded stone, the membrane shown is supported on and the waterways of the roof are provided by a molded plastic sheet 152 having spaced frusto-conical supports provided with additional drain holes 154.

With suitable edge finishing, the green roof system can be arranged to provide for other, either fully or partially enclosed areas on the roof deck for other uses and purposes. Advantageously, this arrangement is suitable for use in combination with installed green roof systems of prior designs. As a result, the modular green roof systems of the present invention can be used as a replacement for portions of prior systems such as in the event a portion of the prior green roof is removed for repair of the underlying roof structure. Partially enclosed areas may also include the irregular edge areas of the roof deck.

Support Framework for Additional Decorative and Functional Add-on Structures

Preferred green roof systems hereof are also provided with a support framework, structure or anchoring system to support add-on components suitable for use for decorative and/or functional purposes to compliment the modular and non-modular aspects of the green roof system.

Figure 26:
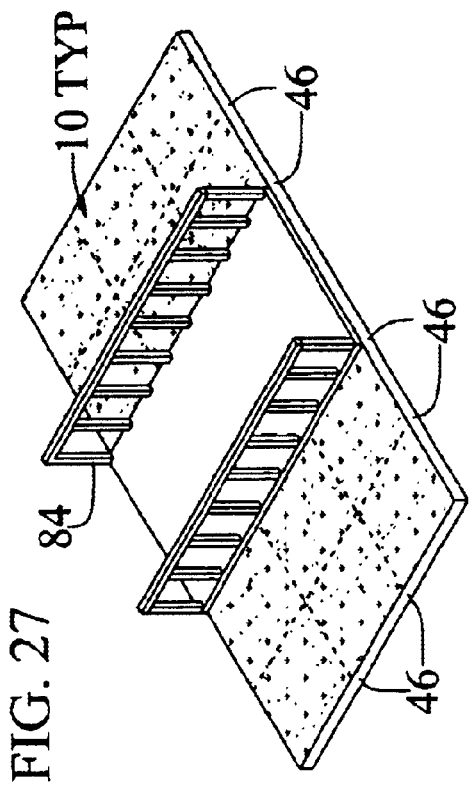
FIG. 26 is a perspective view of an alternate above-ground structure supported be the framework of the green roof system.
Figure 27:
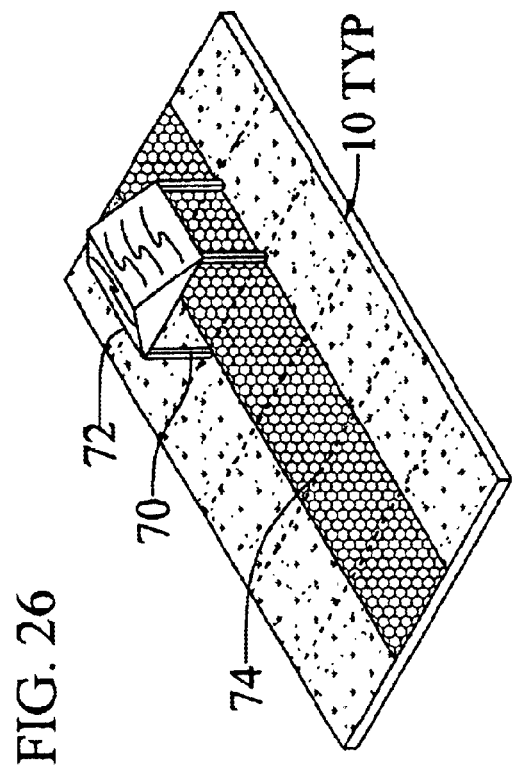
FIG. 27 is a view similar to FIG. 26 of an alternate above-ground structure in the form of a walkway.

Additional or add-on components may be temporary structures such as maintenance walkways or apparatus to assist in installation or removal of filled panels, or they may be semi-permanent structures such as bridges 84 (FIG. 27), trellises, sun shades, sun or weather type gazebos, fabric canopies 72 (FIG. 26) and other desired above-panel structures that are maintained in the installed green roof system.

In carrying out this aspect of the invention, one embodiment of a suitable framework or support structure is provided by the dimensional lumber/composite extrusion edge joining system described above. In this instance, the lumber or extrusion 46 is connected under panel flanges (e.g., 26, 26A) as necessary for support of the desired additional structures, with the structures being secured to the edge framework as required.

Figure 16:
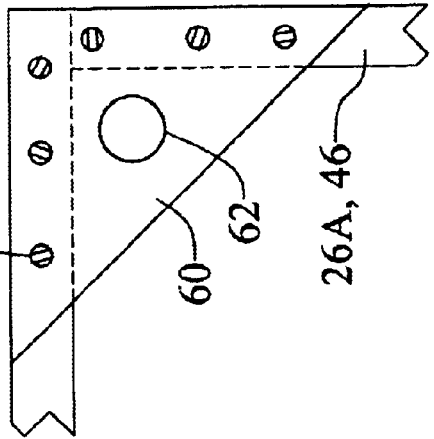
FIGS. 16 and 17 are top and side fragmentary views, respectively, of a support connected to the modular panels/edge system framework and adapted to support an above-roof framework.

Alternately, for example, the support framework includes spaced support plates molded in or secured to the top section of the panels, or secured to the support lumber/extrusion 46 if used therewith, the support plates being adapted for cooperation with the add-on components to provide support thereof. In the embodiment shown in FIGS. 16 and 17, support plates in the form of corner gussets 60 are provided with vertically extending openings 62 sized to receive support poles 70 of the add-on components.

Roof Deck and Green Roof Maintenance and Repair

Advantageously, green roof systems of the present invention are uniquely adapted for ease of maintenance and repair of both the green roof system itself and the underlying roof deck structure.

Bridge Access/Walkway Panels

As illustrated in FIGS. 17 and 18, in green roof systems that include intermediate boundary, panel edge support systems such as the dimensional lumber/composite extrusion edge systems described above, access to the planted areas is provided using the strength of the panel edge support system with a bridge or plank 150, or other bridging mechanism (see e.g., FIG. 27) that is laid over the modular panels and supported by the panel edge support system. The walkways or bridges may include provision to maintain alignment on the panels such as with brackets 152 (FIG. 18). Such walkways can be temporary or permanent to provide walkways for elevated access to the planted areas without disturbing them.

Movement of Filled Panels

In accordance with another aspect of the invention, apparatus is provided for lifting and moving individual filled panels, for installation of the green roof system with pre-seeded or pre-planted panels, and for lifting, removing and replacing individual filled panels from an installed green roof, without the need to disturb surrounding panels.

Advantageously, such a non-progressive arrangement, i.e., the ability to lift and move panels from the installed green roof without the need to disturb adjacent panels, permits access to portions of the underlying roof deck such as for repair or periodic maintenance or access to drain openings without the need to tear-up and destroy large sections of the green roof as with prior green roof systems, and provides the ability to change the green roof design after its initial installation by simply rearranging or replacing desired panels.

More particularly, the modular panels are adapted to connect to and cooperate with an above-panel support and transport framework for lifting and moving thereof.

Panel Lifting and Moving Apparatus

In carrying out this aspect of the invention, the modular panels are provided with grabbing or gripping apparatus adapted to facilitate being lifted vertically upwardly so as to not disturb adjacent panels.

In one embodiment, the panels are provided with lifting hooks, handles, openings or like structure or devices sized to connect to or receive an extension member adapted to extend upwardly to the above-roof support framework.

The extension member can be either a flexible member such as a strap, rope, cable or like carrying and support apparatus, a rigid extension member, a jointed rigid member, or a combination thereof such that the member is adapted for connection between the panels and the above-roof support framework and to lift and support the panels therefrom.

Figure 22:
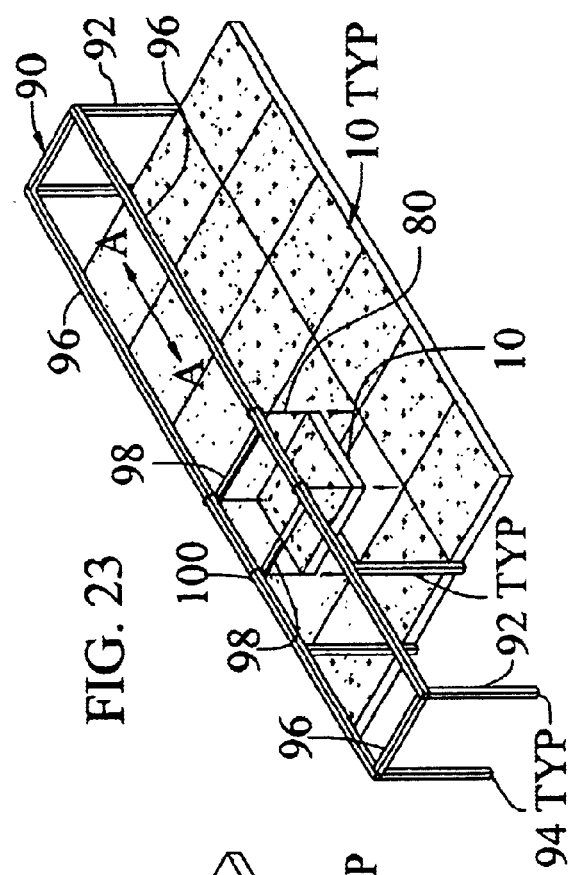
FIG. 22 is a perspective view of an installed green roof and showing a panel being lifted from a predetermined location on the roof deck without disturbing previously installed panels surrounding and adjacent to the predetermined location.

In the embodiment shown in FIGS. 3–4, 20 and 21, the panels 10 are provided with relatively deep grooves 30 formed extending along the bottom of the panel 10, and a flexible cable or strap 80 extends underneath the panel through the grooves. The top of the strap is provided with eyelets 82, hooks or other apparatus suitable for connecting to the above-roof support framework. Such straps or cables can either be permanently positioned under the panels before they are installed onto the roof deck, or fed through the groove prior to lifting the panel. Thus, the filled modular panels can, among other things, be lifted out of the field for access to roof deck in the surrounded area such as indicated at 86 in FIG. 22. Alternately, enclosed grooves or tunnels can be formed along the bottom and extending up the sides of the modular panels to facilitate threading the lifting strap therethrough.

Optional spreader bars 84 are installed across the top of the panels, connected between opposite sides of the panel, and generally aligned with the straps 80, prior to lifting or transport of the panels. The spreader bars prevent the panel from collapsing inwardly onto itself due to the weight of the fill in the panel in the event the design of the panel presents such a possibility. For smaller panels, the spreader bar is also sized to carry the weight of the panel such that the panels can be manually carried with the bar attached.

Supporting Framework

The above-roof framework includes apparatus for connecting to the extension members, lowering and raising the panels after connection thereto, and transporting the panels from one location to another on the roof.

Figure 23:
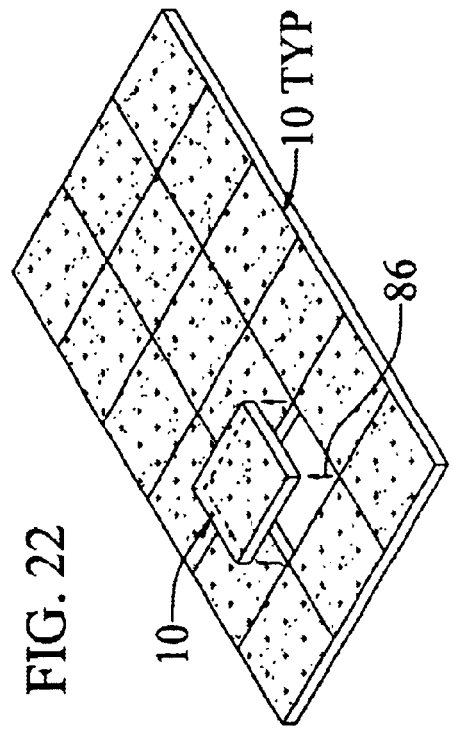
FIG. 23 is a perspective view of an above-roof temporary framework adapted for assisting in installation, removal and moving of filled panels.

FIG. 23 illustrates a framework 90 comprising vertical legs 92 supported with feet 94 and/or in stationary support brackets such as brackets 60, top rails 96 supported on the legs 92, cross-beams 98 releasably connected at 100 to the straps 80, and apparatus for raising and lowering the filled panels and sliding or rolling the raised panels along the rails 96 for repositioning as indicated by arrow A–A.

Figure 24:
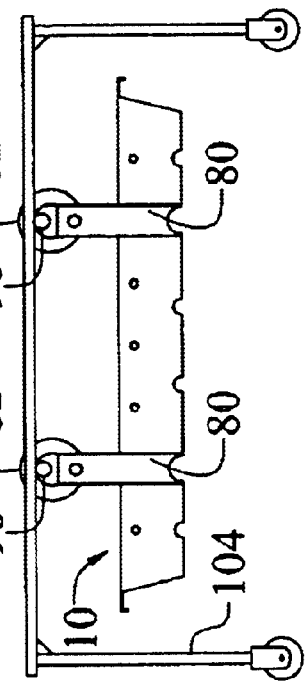
FIGS. 24 and 25 are side views of alternate frameworks suitable for assisting is installation, removal and moving of filled panels.

FIG. 24 illustrates the support rails 98 slipped through the loops 82 such as for use in the rail system of FIG. 23, or simply comprising an alternate framework of spaced parallel rails for manually raising and carrying the filled panels.

Figure 25:
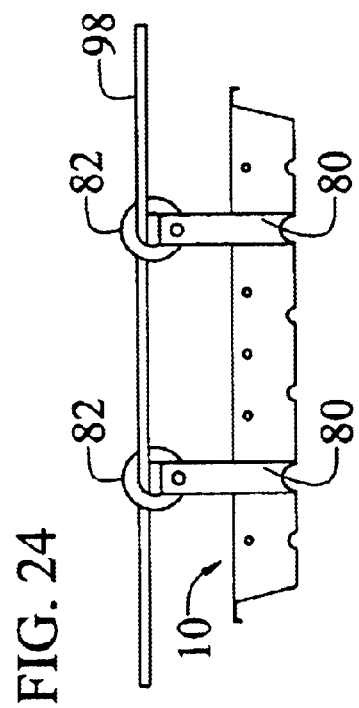

FIG. 25 illustrates another alternate framework 104 with castors or wheels to assist in transporting the filled panels. With such arrangement, the rails 98 may be adapted for manually raising the panel and then connection to the framework, or the rails may be permanently connected, with panel raising and lowering apparatus, and with the wheels adapted for rolling in grooves such as formed in the top of the lumber/extrusion edge support systems discussed above.

Advantageously, such arrangements for lifting and moving filled panels provides for freedom of design of the entire green roof system, including being able to install the green roof system without covering or enclosing the entire roof deck area with a fully seeded or planted area of prior green roof systems, allowing the design of the installed green roof system to be changed as required or desired, and to be able to cooperate with prior green roof systems so as to provide fully seeded and planted area(s) of prior systems in combination with areas of the modular system hereof such as interspaced therewith or around the perimeter Pre-Seeding of Modular Panels In accordance with yet another aspect of the invention, the modular panels 10 are pre-filled with suitable growing medium 110 (see e.g., FIG. 29) and pre-planted with sedum, shrubbery, perennials, foliage and/or other green roof vegetation or plants 112 in accordance with one of several alternate methods, or alternately pre-filled with non-growing decorative materials.

In the case of plant materials, the panels are either pre-planted and then suitably preserved until shipped for installation into a green roof system, or pre-planted, germinated, and maintained in a growing condition until needed.

Advantageously, pre-planted preserved panels can be prepare well in advance of when they will be needed, and then stocked and maintained in a preserved condition for as long as desired. This permits additional selection and quantities of green roof materials to be available during the green roof installation season without concern for spoilage since unused preserved panels can be simply maintained until the next season.

To obtain pre-planted panels in a preserved state, ready for installation, the panels are filled with sanitized dry earth or other suitable growing medium 114, pre-seeded with sedum or other perennial seed, and maintained in a dry state to preclude germination.

Alternately, for example, the plants in the panels may be germinated and pre-grown in a greenhouse, and as they reach the appropriate growth for the geographic area in which they are to be located, and frozen as would occur during the normal winter cycle for perennials of such type. The frozen pre-grown panels are then cryogenically preserved until shipped for installation into a green roof system.

Cryogenically preserving pre-grown panels offers the unique ability to stock a selection of "ready to grow" materials without the need to maintain growing plants and the expense associated therewith. Thus, a greater selection can be prepared in advance, without concern for additional costs of maintenance or spoilage if not used within a specific time period.

Advantageously, the growing medium used in the modular panels may also include the same types of materials used in prior green roof systems such as pre-cut mats of mineral wool or water retention substrate, and pre-cut mats of pre-seeded fiber fleece. Thus, manufacturers and suppliers or prior green roof systems are able to also supply and realize the benefits of modular green roof systems in accordance herewith using many of the same materials.

Storage of Pre-Planted Modular Panels

In keeping with the invention, the pre-planted panels 10 are stored in a manner suitable for preserving the plants therein.

For example, pre-planted pre-growing panels can be stored in a greenhouse, maintaining the growing condition of the plants until shipped to an installation site. Such storage can be provided on shelves, or if provided with covers suitable to permit exposure to light, watering and air circulation, the panels can be stored in stacks.

In the case of pre-planted panels that are preserved in a non-growing state, the panels are optionally sealed by vacuum packing, with a complete vacuum liner 120 (FIG. 29) such as of approximately 6-8 mil thickness surrounding the entire panel. This vacuum packed package 122 is then either dry or cryogenically preserved to prohibit any or further growth, and to protect from contamination, moisture, and sunlight (if provided with a sun-blocking film). The panels are then maintained ready for shipment and placement as desired at the job site with an assured pre-seeded type of foliage or growth that would match and be identified by alphanumeric characteristics such as generally indicated by the pairs of numbers shown in FIG. 1. The advantages of such pre-planting and pre-packaging includes the simplicity and freedom of green roof system design. And the cryogenically preserved panels assure growth within a relatively short time assuming the green roof is installed during the warmer months.

Shipping of Pre-Planted Modular Panels

The pre-seeded panels are also adapted for ease of shipment to the installation site with provision of covering, stacking and banding the stacked panels together.

Figure 29:
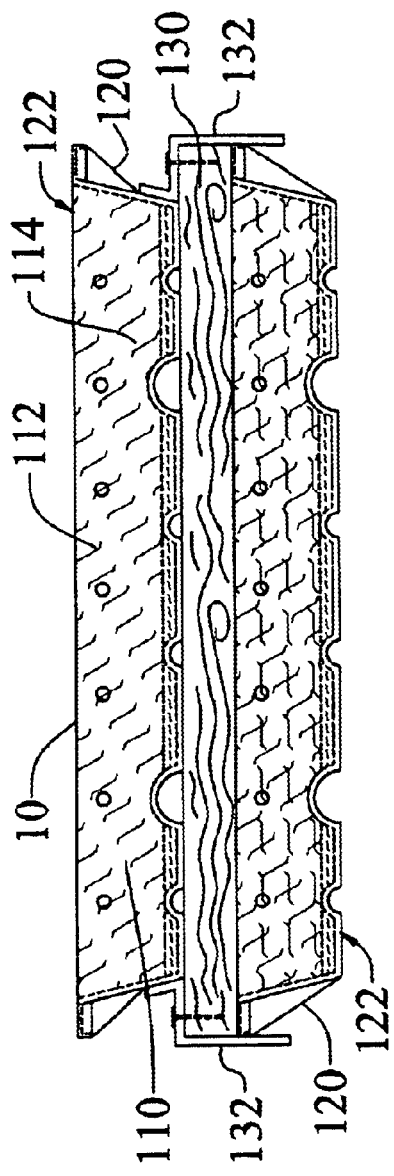
FIG. 29 is an enlarged side view illustrating certain aspects of pre-seeding, preserving and shipping of modular panels.

To this end, and if not provided previously such as for purposes of storage, stacking for shipment may be provided for with a rigid cover or separator 130 such as made from a plywood board, rigid composite extrusion or other suitable rigid material, pre-cut to size, and placed over the panels (see FIG. 29). An edge extrusion 132, shaped and sized for cooperation between the upper portion of the lower panel and/or its cover (e.g. 130), and the lower portion of the adjacent upper panel, is secure between the stacked panels to prevent the panels from slipping relative to one another. This allows the panels to be stacked and secured or banded together for shipping. Alternately, a molded rigid cover may be provided with an integrally molded edge extension, or integrally molded pattern configured to interlock with, for example, the grooves 30 or the waffle design of the bottom of the panel stacked thereon.

Figure 30:
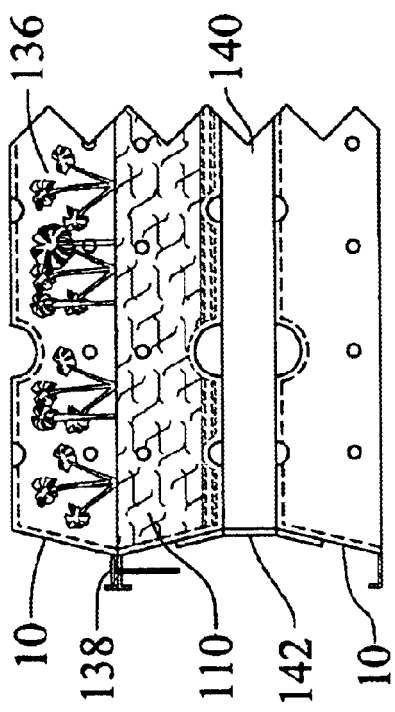
FIG. 30 in an enlarged fragmentary side view illustrating certain aspects of shipping panels with larger pre-growing plants.

Shipping of panels with plants 136 or other items that extend above the top of the panel 10 requires the use of a rigid cover with a "bubble" sized to protect the plants during shipment. FIG. 30 illustrates one particularly advantageous arrangement for preparing such pre-planted panels for shipment. In this instance, the shipping lid is an empty panel 10 which is turned upside down onto the filled panel, with the edges of the panels temporarily secured together as indicated at 138. Also shown in FIG. 30 is a rigid separator board 140 between the stacked panels with an edge extrusion 142 fastened to secure the stacked panels from sliding during shipment. Alternately, in contemplation of using empty panels as shown to protect contents of filled panels, the lower portions of the panels are molded with connector receiving indentations or openings adapted for receiving temporary shipping connectors that would secure the "top" of an inverted panel with the bottom of the upright panel stacked thereon. In view of the disclosure hereof, those skilled in the art will appreciate numerous variations and other methods suitable for use in pre-filling, planting, and otherwise preparing the modular panels for use in green roof systems according to the invention.

From the foregoing, it will be apparent that the present invention brings to the art new and improved green roof system and associated methods therefor, including uniquely configured pre-seeded modular panels and associated apparatus for use therewith.

I claim:

1. A method of constructing a modular green roof system comprising the steps of:

(A) providing a plurality of panels each having a bottom and sides extending upwardly therefrom to define a surrounded space with an open top for receiving green roof materials, the bottom of the panels being formed with drain holes and being shaped to permit water to flow thereunder when resting on a roof, (B) planting growable green roof materials in the panels, (C) establishing an air-tight seal over the open top of the panels to seal the green roof materials in the panels, (D) delivering the filled panels to a roof site, and (E) positioning the panels onto the roof in side-by-side relation.

2. The method of claim 1 further comprising the step of (F) connecting the panels on the roof to one of (i) adjacent panels, (ii) intermediate members, and (iii) edge termination members.

3. The method as defined in claim 1 further comprising the steps of (F) stacking said planted, sealed panels, and (G) securing said stacked panels to prevent sliding therebetween, prior to said delivering step.

4. A method of constructing a modular green roof system comprising the steps of:

(A) providing (i) a plurality of panels each having a bottom and sides extending upwardly therefrom to define a surrounded space for receiving green roof materials, the bottom of the panels being formed with drain holes and being shaped to permit water to flow thereunder, and (ii) a plurality of covers to fit over the panels, (iii) means for connecting the panels and covers together to prevent sliding therebetween, (B) planting growable green roof materials in the panels, (C) positioning said covers onto said panels, (D) stacking and connecting first ones of said panels onto the covers positioned on second ones of said panels in with said connecting means, (E) delivering the planted, stacked, panels to a roof site, and (F) positioning the panels onto the roof.

5. The method of claim 4 in which said covers comprise inverted panels.

6. The method of claim 4 further comprising the step of connecting the panels on the roof to one of (i) adjacent panels, (ii) intermediate members, and (iii) edge termination members.

7. The method of claim 4 further comprising the steps of (G) germinating the green roof materials in the panels, and (H) positioning said covers onto said panels over the germinated green roof materials.

* * * * *